United States Patent
Yamaguchi et al.

(10) Patent No.: US 6,207,323 B1
(45) Date of Patent: Mar. 27, 2001

(54) HYDROGEN STORAGE ALLOY ELECTRODE

(75) Inventors: Seiji Yamaguchi, Toyohashi; Shinichi Yuasa, Kyotanabe; Munehisa Ikoma, Toyohashi, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/263,756

(22) Filed: Mar. 5, 1999

(30) Foreign Application Priority Data

Mar. 9, 1998 (JP) .................................................. 10-057017

(51) Int. Cl.$^7$ .............................. H01M 4/58; C22C 6/24
(52) U.S. Cl. .......................................... 429/218.2; 420/900
(58) Field of Search ............................... 429/218.2, 226; 420/900

(56) References Cited

U.S. PATENT DOCUMENTS

| | | | |
|---|---|---|---|
| 5,512,385 | * 4/1996 | Komori et al. | 429/101 |
| 5,922,491 | * 7/1999 | Ikawa et al. | 429/218 |

FOREIGN PATENT DOCUMENTS

| | | |
|---|---|---|
| 2-236955 | 9/1990 | (JP) . |
| 5-062670 | 3/1993 | (JP) . |
| 5-343058 | 12/1993 | (JP) . |
| 5-343059 | 12/1993 | (JP) . |
| 6-215765 | 8/1994 | (JP) . |
| 8-321302 | 12/1996 | (JP) . |
| 9-007588 | 1/1997 | (JP) . |

* cited by examiner

*Primary Examiner*—Carol Chaney
*Assistant Examiner*—Angela J. Martin
(74) *Attorney, Agent, or Firm*—Akin, Gump, Strauss, Hauer & Feld, L.L.P.

(57) ABSTRACT

Disclosed is a hydrogen storage alloy electrode for use in alkaline storage batteries that can reduce internal resistance of the battery and can give an excellent output characteristic and a long cycle life to the battery. The electrode comprises an $AB_5$-type hydrogen storage alloy powder, a yttrium compound and a compound of a light rare earth element. The total content of the yttrium compound and the compound of a light rare earth element is in a range of 0.5 to 2.0 parts by weight per 100 parts by weight of hydrogen storage alloy powder. Preferable ratios of the yttrium compound and the compound of a light rare earth element selected from La, Ce, Pr and Nd are, respectively, 60 wt % or more and 7 wt % or less in the total amount of the yttrium compound and the compound of the light rare earth element.

4 Claims, 3 Drawing Sheets

HYDROGEN STORAGE ALLOY ELECTRODE

BACKGROUND OF THE INVENTION

The present invention relates to a hydrogen storage alloy electrode for use as a negative electrode of an alkaline storage battery such as nickel-metal hydride storage battery or the like.

An alkaline storage battery including a hydrogen storage alloy electrode as the negative electrode which is large in energy density and low in environmental pollution has been widely used as the power source for handy phones and electric vehicles in place of nickel-cadmium storage battery and lead acid storage battery.

Such kind of alkaline storage battery, however, has a drawback of vulnerability to corrosion of the constituents of the hydrogen storage alloy negative electrode by an alkaline electrolyte upon repeated charge and discharge cycles resulting in formation of an oxide film on the surface of the alloy. The oxide film acts to elevate the internal resistance of the battery and impairs its output characteristic. On the other hand, there has been an increasing demand recently for an alkaline storage battery having a higher output characteristic and a measure for inhibiting the corrosion of the hydrogen storage alloy has been desired to minimize decreases in the output characteristic as noted above.

Another drawback of the alkaline storage battery is that oxygen gas generating from the positive electrode upon overcharge accelerates oxidation of the hydrogen storage alloy. As a result, charge acceptance of the hydrogen storage alloy decreases and the hydrogen pressure during charge operation increases, which in turn causes an elevation of the internal pressure of the battery, a leakage of the electrolyte due to actuation of a safety valve, an increase in the internal resistance of the battery, and a decrease in discharge capacity with the progress of charge and discharge cycles.

In order to reduce the oxidation of the hydrogen storage alloy, there has been a proposed method in Japanese Laid-Open Patent Publications Hei 6-215765 and Hei 9-7588 which adds, to the hydrogen storage alloy negative electrode, a compound of yttrium such as yttrium oxide or a compound of a light rare earth element such as lanthanum, cerium, praseodymium or neodymium.

Yttrium compound such as yttrium oxide has been considered to dissolve in the alkaline electrolyte and then redeposit on the surface of the hydrogen storage alloy to form a coating on the alloy surface thereby best preventing corrosion of the alloy. However, the coating can act as a resistance during charge operation, which is not preferable from the aspect of realization of a high output power.

On the other hand, light rare earth elements such as lanthanum, cerium and the like are more basic than other rare earth elements and are liable to form a stable and passive state protective film in an alkaline electrolyte. Therefore, addition of a large amount of a compound of such light rare earth element to the electrode impairs the output characteristic of the resultant battery.

BRIEF SUMMARY OF THE INVENTION

The object of the present invention is to provide a hydrogen storage alloy electrode which solves the above-mentioned problems and can yield an alkaline storage battery having an excellent output characteristic and a long cycle life.

The present invention provides a hydrogen storage alloy electrode comprising an $AB_5$-type hydrogen storage alloy powder, a yttrium compound and a compound of a light rare earth element.

In a preferred mode of the present invention, the compound of a light rare earth element should be a compound of an element selected from the group consisting of lanthanum, cerium, praseodymium and neodymium.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

As stated above, the hydrogen storage alloy electrode in accordance with the present invention comprises an $AB_5$-type hydrogen storage alloy powder, a yttrium compound and a compound of a light rare earth element. This structure facilitates realization of a hydrogen storage alloy electrode having a better output characteristic and a longer cycle life than those of the electrode incorporating only either yttrium compound or a compound of a light rare earth element.

As noted above, the yttrium compound dissolves in an alkaline electrolyte and then redeposits on the surface of the hydrogen storage alloy to form a coating, thereby reducing corrosion of the alloy. However, the coating inversely can act as a resistance during charging and impairs the output characteristic of the battery. Therefore, the content of yttrium compound must be determined carefully taking into account the balance between the life and output of the resultant battery.

The present inventors found that addition of a mixture of a yttrium compound with a compound of a light rare earth element to the hydrogen storage alloy powder gives an exceptional hydrogen storage alloy electrode which can exhibit an excellent output characteristic and a long cycle life.

It is estimated that when a compound of a light rare earth element is added together with yttrium compound, there occurs, on the surface of the hydrogen storage alloy, partial substitution of the coating formed by the yttrium compound with the protective film formed by the compound of a light rare earth element. This results in formation of a gap between the coating of the yttrium compound and the protective film of the compound of a light rare earth element on the surface of the alloy, rendering the alloy surface conductive.

Figure 1:
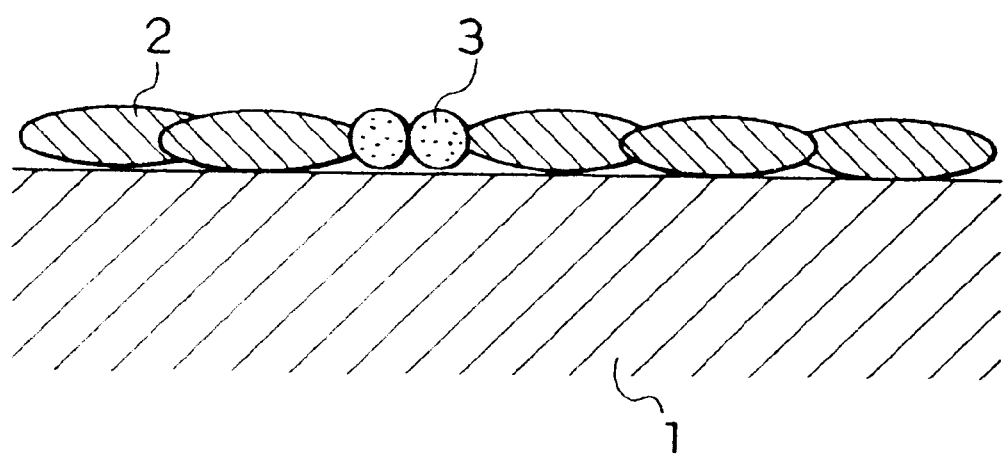
FIG. 1 is a schematic sketch illustrating the surface of the hydrogen storage alloy electrode in accordance with the present invention.

FIG. 1 is a schematic sketch of the surface of the hydrogen storage alloy electrode in accordance with the present invention. The surface of a hydrogen storage alloy electrode 1 is mostly coated by a yttrium compound 2 but partially coated by a light rare earth element compound 3.

Any light rare earth element can also serve as a constituent of the $AB_5$-type hydrogen storage alloy and therefore its addition in small amounts has almost no influence on the output characteristic. This may explain why a hydrogen storage alloy electrode incorporating a mixture of a yttrium compound and a compound of a light rare earth element gives a battery which is reduced in internal resistance and increased in output characteristic than the battery using a hydrogen storage alloy electrode incorporating only yttrium compound.

The hydrogen storage alloy for constituting the electrode in accordance with the present invention is an $AB_5$-type hydrogen storage alloy, where A represents an element, such as La, Zr, Ti etc., having a larger affinity for hydrogen and B represents an element, such as a transition metal exemplified as Ni, Mn, Cr, etc., having a smaller affinity for hydrogen. A particularly preferred $AB_5$-type hydrogen storage alloy is a multi-element alloy of La—Ni or Mm—Ni system where Mm represents a Misch metal (Mm) or a mixture of rare earth elements. Known various examples of the La—Ni or Mm—Ni system multi-element alloy are $MmNi_{3.55}Co_{0.75}Mn_{0.4}Al_{0.3}$, $MmNi_{4.2}Mn_{0.6}Al_{0.2}$, $MmNi_3Co_{1.5}Al_{0.5}$, $La_{0.8}Nd_{0.2}Ni_{2.5}Co_{2.4}Si_{0.1}$.

A suitable content of the compounds of rare earth elements in the hydrogen storage alloy is in a range of 0.5 to 2.0 parts by weight per 100 parts by weight of hydrogen storage alloy. A smaller content than the above range cannot produce the effect of reducing the corrosion. Whereas, a larger content than the above range causes an apparent elevation of the internal resistance of the battery. Of the compounds of rare earth elements, a preferable ratio of yttrium compound is 60 wt % or more and that of the compound of a light rare earth element is 7 wt % or less.

In addition to the above-mentioned rare earth elements, other rare earth elements such as Er, Yb and Dy may also be included in the compounds of rare earth elements to be added to the hydrogen storage alloy in a range to satisfy the above-mentioned requirements.

It is desirable for the present invention to use yttrium oxide or yttrium hydroxide as the yttrium compound. As the compound of a light rare earth element, an oxide or hydroxide of an element selected from the group consisting of lanthanum, cerium, praseodymium and neodymium is preferred.

In the following, the present invention will be described more specifically.

EXAMPLE 1

A hydrogen storage alloy represented by the formula $MmNi_{3.6}Mn_{0.4}Al_{0.3}Co_{0.7}$ was produced using a known arc melting method. After rough grinding, the alloy was further pulverized into a powder having a mean particle size of about 20 μm using a ball mill. To 100 parts by weight of the alloy powder thus obtained, one part by weight of a mixture of rare earth element compounds and one part by weight of an aqueous dispersion of styrene- butadiene rubber (solids) as a viscosity improver were added and kneaded to form a paste. The mixture of the rare earth element compounds is composed of $Y_2O_3$, one or more compounds selected from the group of light rare earth elements consisting of $La_2O_3$, $CeO_2$, $Pr_5O_{11}$ and $Nd_2O_3$ and the other rare earth elements (i.e., $Er_2O_3$, $Yb_2O_3$ and $Dy_2O_3$). All the oxides have a purity of 99.9%.

The paste was applied onto a nickel-plated iron perforated metal sheet, dried and pressed, which sheet was then cut to a predetermined size of 10 cm×15 cm×0.05 cm for use as a negative electrode.

The positive electrode was produced as follows: Five parts by weight of a cobalt hydroxide powder, five parts by weight of a metallic cobalt powder, two parts by weight of a zinc oxide powder were added to 100 parts by weight of a nickel hydroxide powder together with a calcium fluoride powder and water, and kneaded to form a paste. The paste was injected into a porous nickel substrate, dried and pressed, which substrate was then cut to a predetermined size. The positive electrode thus produced has a capacity of about 8 Ah.

13 sheets of the negative electrode and 12 sheets of the positive electrode were laminated with separators made of sulfonated polypropylene being interposed therebetween, and the resultant laminate was placed in a rectangular battery case. Then, the case was injected with an alkaline electrolyte and sealed with a sealing plate mounted with a safety valve. In this way, a battery with a nominal capacity of 95 Ah was produced, the capacity being regulated by the positive electrode. The alkaline electrolyte used here is an aqueous potassium hydroxide solution (specific gravity, 1.3) dissolving lithium hydroxide at 20 g/l.

Various batteries were produced similarly by varying the ratio of yttrium oxide in the mixture of rare earth element compounds included in the negative electrode.

Figure 2:
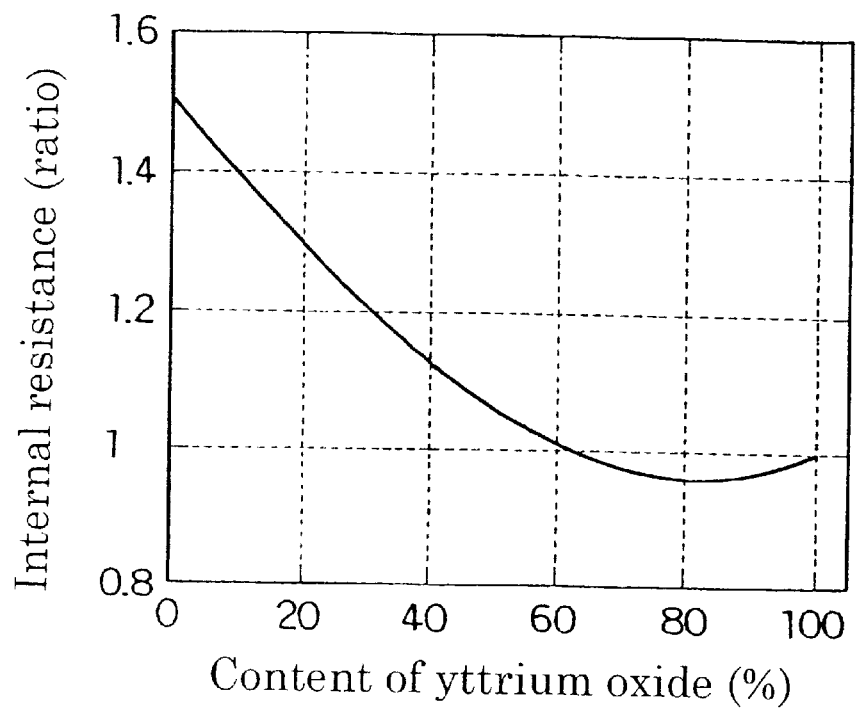
FIG. 2 is a graph showing the relationship between the content of yttrium oxide in the mixture of rare earth element compounds incorporated in the negative electrode in accordance with one example of the present invention and internal resistance of the battery including this negative electrode after 300 cycles.

Each of the batteries thus produced was tested by consecutive 300 cycles of charge and discharge, one course of cycle being composed of a charge at a current corresponding to 0.1 C for 10 hours at a temperature of 35° C., a 30-min rest, a discharge at a current corresponding to 0.5 C until the voltage drops down to 1.0 V and another 30-minute rest. FIG. 2 is a graph showing the relationship between the content of yttrium oxide in the mixture of rare earth element compounds incorporated in the negative electrode and internal resistance of the battery including this negative electrode after 300 cycles. The ratio of yttrium oxide in the mixture of the rare earth element compounds was varied by fixing the total content of $La_2O_3$, $CeO_2$, $Pr_5O_{11}$ and $Nd_2O_3$ at 4 wt % and varying the ratios of other rare earth element compounds such as $Er_2O_3$, $Yb_2O_3$, $Dy_2O_3$ and the like in the mixture.

As evident from the figure, batteries whose negative electrode contains 60 wt % or more yttrium oxide in the mixture of rare earth element compounds are all free of increases in internal resistance.

Figure 3:
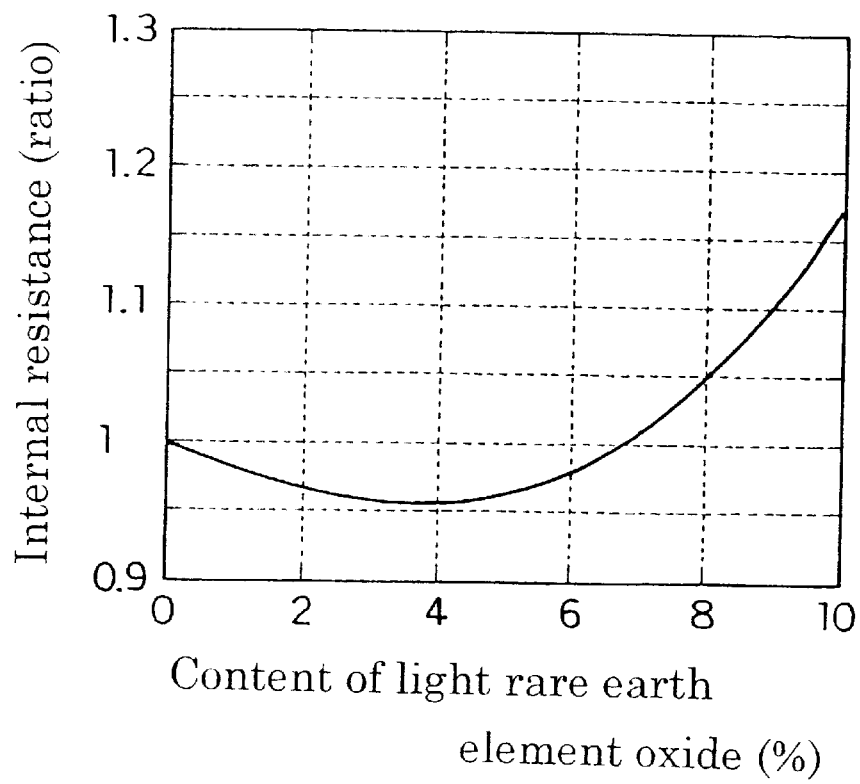
FIG. 3 is a graph showing the relationship between the content of light rare earth element oxide in the mixture of rare earth element compounds incorporated in the negative electrode in accordance with one example of the present invention and internal resistance of the battery including this negative electrode after 300 cycles.

Next, batteries were produced by varying the content of an oxide or oxides of the light rare earth element in the mixture of rare earth element compounds incorporated in the negative electrode. Those batteries were tested by 300 cycles of charge and discharge under the same conditions as shown above to examine the relationship between the content of the light rare earth element oxide or oxides and internal resistance of the battery. The results are shown in FIG. 3. The total content of $La_2O_3$, $CeO_2$, $Pr_5O_{11}$ and $Nd_2O_3$ in the mixture of the rare earth element compounds was varied by fixing the ratio of yttrium oxide at 80 wt % and varying the ratios of other rare earth element compounds such as $Er_2O_3$, $Yb_2O_3$, $Dy_2O_3$ and the like in the mixture. The figure clearly indicates that batteries whose negative electrode contains 7 wt % or less light rare earth element oxide or oxides in the mixture are all free of increases in internal resistance.

EXAMPLE 2

A nickel-metal hydride battery was produced in the same manner as in Example 1, except that the total content of $La_2O_3$, $CeO_2$, $Pr_5O_{11}$ and $Nd_2O_3$ was 4 wt %, the yttrium oxide occupied 80 wt % and other rare earth element compounds such as $Er_2O_3$, $Yb_2O_3$, $Dy_2O_3$ occupied the remaining in the mixture of rare earth element compounds. This battery was named battery "A".

For comparison, another battery "B" was produced in the same manner as in Example 1, except that light rare earth element compounds $La_2O_3$, $CeO_2$, $Pr_5O_{11}$ and $Nd_2O_3$ were absent, the yttrium oxide occupied 80 wt % and other rare earth element compounds such as $Er_2O_3$, $Yb_2O_3$, $Dy_2O_3$ occupied the remaining in the mixture of rare earth element compounds. Similarly, another battery "C" of comparative example was produced by omitting the mixture of rare earth element compounds.

Figure 4:
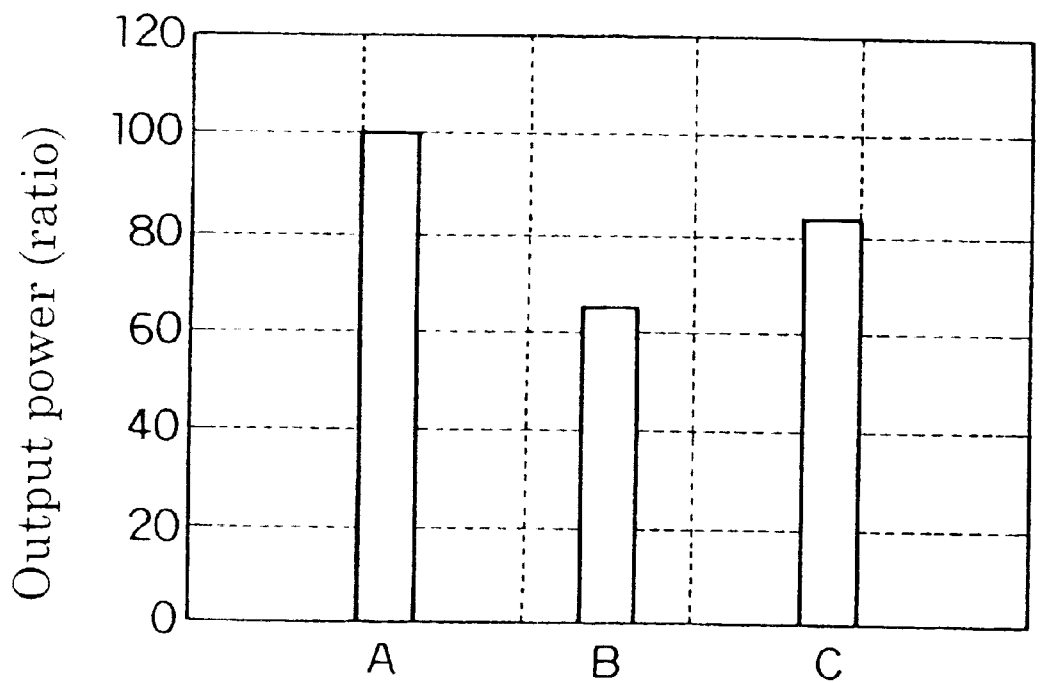
FIG. 4 is a graph illustrating output characteristic of the battery of other example in accordance with the present invention and those of comparative examples.

The batteries "A", "B" and "C" were tested by consecutive 300 cycles of charge and discharge under the same conditions as in Example 1 in order to evaluate their output characteristic. The results are shown in FIG. 4. As evident from the figure, battery "B" including only yttrium oxide and other rare earth element compounds was less in collapse of the alloy and improved in output characteristic compared to battery "C" which does not include the oxide of rare earth element, but is far competitive compared to battery "A" of Example 2 including the oxide of light rare earth element.

It is noted that regardless of the number of oxide of light rare earth element in the mixture of rare earth element compounds, the results are almost the same.

In the foregoing examples, the compounds of rare earth elements were oxides of rare earth elements and the content of the mixture of rare earth element compounds was one part by weight per 100 parts by weight of hydrogen storage alloy. However, similar effects can be expected from the use of hydroxide or hydroxides of rare earth elements and contents of the mixture of rare earth element compounds in a range of 0.5 to 2.0 parts by weight per 100 parts by weight of hydrogen storage alloy.

As discussed above, the present invention can provide a hydrogen storage alloy electrode for use in alkaline storage battery which reduces internal resistance of the resultant battery and gives an excellent output characteristic and a long cycle life to the battery.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A hydrogen storage alloy electrode comprising an $AB_5$-type hydrogen storage alloy powder, a yttrium compound selected from the group consisting of yttrium oxides and yttrium hydroxides and a compound of a light rare earth element selected from the group consisting of light rare earth oxides and light rare hydroxides.

2. The hydrogen storage alloy electrode in accordance with claim 1, wherein said compound of a light rare earth element is a compound of an element selected from the group consisting of lanthanum, cerium, praseodymium and neodymium.

3. The hydrogen storage alloy electrode in accordance with claim 1, wherein total content of said yttrium compound and said compound of a light rare earth element is in a range of 0.5 to 2.0 parts by weight per 100 parts by weight of said hydrogen storage alloy powder.

4. The hydrogen storage alloy electrode in accordance with claim 3, wherein said yttrium compound is contained 60 wt % or more and said compound of a light rare earth element is contained 7 wt % or less in the total amount of said yttrium compound and said compound of a light rare earth element.

* * * * *

UNITED STATES PATENT AND TRADEMARK OFFICE
CERTIFICATE OF CORRECTION

PATENT NO. : 6,207,323 B1
DATED : March 27, 2001
INVENTOR(S) : Seiji Yamaguchi, Shinichi Yuasa and Munehisa Ikoma Page 1 of 1

It is certified that error appears in the above-identified patent and that said Letters Patent is hereby corrected as shown below:

Column 6,
Line 21, after "rare", please insert -- earth --.

Signed and Sealed this

Thirteenth Day of November, 2001

Attest:

NICHOLAS P. GODICI
Attesting Officer
Acting Director of the United States Patent and Trademark Office